United States Patent
Beverly

(10) Patent No.: US 8,018,935 B2
(45) Date of Patent: Sep. 13, 2011

(54) ADDRESS SEARCH

(75) Inventor: Harlan T. Beverly, McDade, TX (US)

(73) Assignee: Intel Corporation, Santa Clara, CA (US)

( * ) Notice: Subject to any disclaimer, the term of this patent is extended or adjusted under 35 U.S.C. 154(b) by 3163 days.

(21) Appl. No.: 10/319,732

(22) Filed: Dec. 12, 2002

(65) Prior Publication Data

US 2004/0114568 A1     Jun. 17, 2004

(51) Int. Cl.
*H04L 12/28* (2006.01)

(52) U.S. Cl. .................. 370/392; 370/395.32; 370/401; 709/238

(58) Field of Classification Search ............. 370/395.31, 370/395.32, 395.3, 402; 709/242; 711/216
See application file for complete search history.

(56) References Cited

U.S. PATENT DOCUMENTS

| | | | |
|---|---|---|---|
| 5,251,205 A | 10/1993 | Callon et al. | |
| 5,949,786 A | 9/1999 | Bellenger | |
| 6,434,144 B1 | 8/2002 | Romanov | |
| 6,490,279 B1 * | 12/2002 | Chen et al. | 370/392 |
| 6,526,055 B1 * | 2/2003 | Perlman et al. | 370/392 |
| 6,691,218 B2 * | 2/2004 | Brown | 711/216 |
| 2002/0126662 A1 * | 9/2002 | Geevarghese et al. | 370/389 |

OTHER PUBLICATIONS

Miguel A. Ruiz-Sanchez et, al., Survey and Taxonomy of IP Address Lookup Algorithms, IEEE Network Mar./Apr. 2001, pp. 8-23.
Marcel Waldvogel et, al., Scalable High Speed IP Routing Lookups, Sep. 2002, pp. 1-12.

* cited by examiner

*Primary Examiner* — Ian N Moore
(74) *Attorney, Agent, or Firm* — Caven & Aghevli LLC

(57) ABSTRACT

In general, in one aspect, the disclosure describes a method of searching for an address within a collection of addresses. The method includes identifying a section storing an ordered subset of a collection of addresses. The identifying is based on a comparison of the address with at least one section boundary value. The method also includes searching the identified section for a match for the address.

23 Claims, 6 Drawing Sheets

| Address | Mask | Ethernet Address | Interface |
|---|---|---|---|
| 10.1.132.2 | /32 (FF.FF.FF.FF) | | |
| 192.0.0.0 | /8 (FF.00.00.00) | | |
| 192.168.0.0 | /16 (FF.FF.00.00) | | |
| 192.168.12.0 | /24 (FF.FF.FF.00) | ... | ... |
| 192.168.12.129 | /32 (FF.FF.FF.FF) | | |
| 206.21.139.0 | /24 (FF.FF.FF.00) | | |

FIG. 3

ADDRESS SEARCH

BACKGROUND

Computers, and other network devices, communicate by sending packets to one another over a network. By analogy, a packet is much like a mailed letter. That is, a letter is like a packet's payload while the mailing address is like a network destination address stored in a packet's header.

A packet traveling across a network may make many "hops" before reaching its final destination. For example, a packet may be handled by network devices known as routers that examine a packet's destination address to determine how to forward the packet further toward its destination. Typically routers perform this task by accessing routing tables that indicate where to forward packets destined for a particular address.

Because they are numeric, network addresses can be somewhat cryptic. For example, a computer may have an Internet Protocol (IP) address of "11000000101000000000110010000001". For convenience, this string of binary bits can be expressed as "192.160.12.129" where each of the four numbers is the decimal expression of eight of the binary bits (e.g., $192_{decimal}$ represents the first eight bits, $1100000_{binary}$, of the address).

Routing tables often include entries for specific network addresses. For example, a table can specify where to forward a packet destined for address "192.160.12.129". This is known as a "direct route" entry.

Routing tables may also include entries for collections of network addresses. For example, a routing table entry may specify where to forward packets starting with the address prefix of "192.160". Thus, a packet destined for "192.160.11.11" and a packet destined for "192.160.99.99" would both be handled by the same table entry since they both start "192.160". Entries for collections of addresses are known as "indirect routes". An indirect route is often expressed as a network address followed by a prefix mask. For example, for the route "192.160.0.0/16" the "16" identifies the number of bits in the mask. Thus, in this example, the mask is 16-bits long and, therefore, the first two digits in the decimal string (i.e., "192.160").

Potentially, multiple route entries in a routing table may overlap. For example, a direct route entry of "192.160.12.129/32" and an indirect route entry of "192.160.0.0/16" both encompass the network address "192.160.12.129". Additionally, the routing table may include other indirect routes such as "192.160.12.0/24". Potentially, these different entries may specify different handling information for a packet. To resolve this apparent dilemma over which route entry to use, routers can implement "best matching prefix" (a.k.a. "longest prefix matching") algorithms. A best matching prefix algorithm selects the most specific route matching a network address (e.g., the matching route entry with the longest prefix). Thus, in this example, a packet destined for "192.160.12.129" would be handled by the direct route information stored for entry "192.160.12.129/32" which has a longer mask than "192.160.0.0/16" or "192.160.12.0/24".

BRIEF DESCRIPTION OF THE DRAWINGS

FIG. 3 is a diagram of a section of addresses.

DETAILED DESCRIPTION

Figure 1:
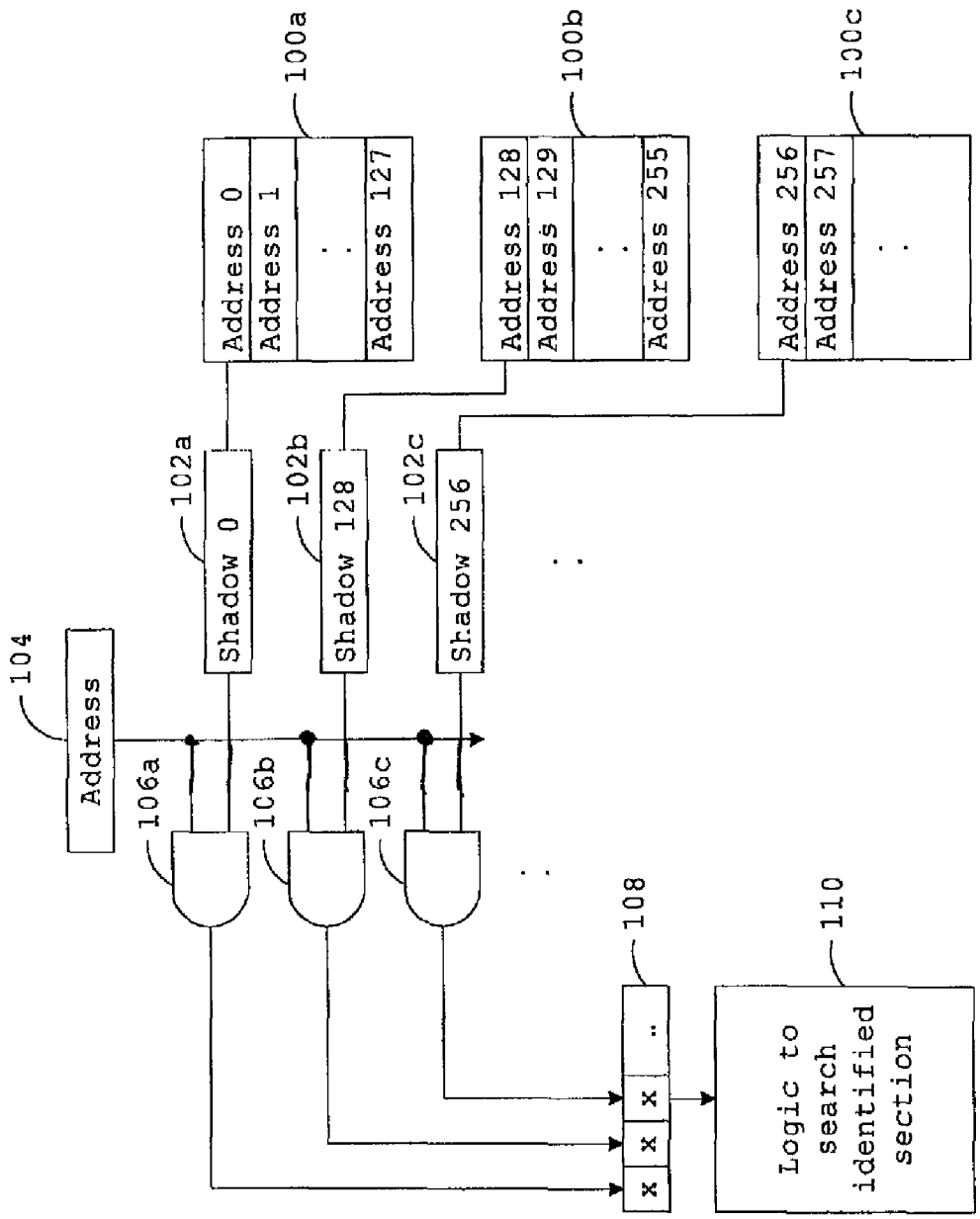
FIGS. 1 and 2 are diagrams of a system for looking up an address.

The continued growth of network traffic and continued increases in network connection speeds place greater demands on network devices to perform packet processing operations quickly. These operations include network address lookups, for example, used in packet classification, filtering, and forwarding. FIG. 1 depicts an example of a system that illustrates techniques that can, potentially, not only speed address lookup operations, but can also, potentially, conserve memory used to store lookup information.

As shown, the system divides a collection of ordered addresses (e.g., the network addresses in a routing table) into a set of sections 100*a*-100*c*. The addresses may be ordered in descending or ascending order. For the purposes of ordering, unmasked bits of indirect routes may be set to "0". For example, an indirect IP route entry for "192.160.12.32/24" may be stored as "192.160.12.0" since the mask identifies the first three decimal digits of the address as the prefix.

As shown, the system stores shadow copies 102*a*-102*c* of boundary values of the sections 100. For example, the system may include hardware registers to store the first or last network addresses of different sections 100. For instance, in the implementation shown, shadow register 102*a* stores the value of the first network address in section 100*a*, shadow register 102*b* stores the value of the first network address in section 100*b*, and so forth. As section 100 contents change, the system updates the values of the shadow registers 102.

To perform a lookup, an address 104 is compared to the shadow values 102. For example, the shadow values 102 and address 104 may be applied to a collection of comparators 106 in parallel. In the implementation shown, the comparators 106 can output an indication of whether the network address 104 is greater than or equal to a boundary value 102. That is, comparator 106*a* can output a "1" if the network address 104 is greater than or equal to the address stored in shadow register 102*a*. Otherwise, the comparator 106*a* can output a "0".

The outputs of the comparators 106 can build an array of bits 108 where individual bits identify whether the network address 104 is greater than or equal to the corresponding shadow value 102 of a section 100. For example, assuming the network address 104 was stored in section 100*b*, the bit array 108 would have a value of "110 . . . ". The transition from "1" values to "0" values within the array 108 identifies the section 100*b* that will store an entry for the address if one exists.

As shown, search logic 110 can access the comparator 106 output to identify a section 100 to search. The search may be performed using a wide variety of searching algorithms (e.g., a linear or depth-first search). For example, the logic 110 may perform a binary search of entries within the identified section 100*b*. Briefly, a binary search identifies a mid-point (or near mid-point) of a section and compares the mid-point with the value being searched for. Since section entries are ordered, this comparison conceptually divides the section in half. Thus, if the value exceeds the mid-point, the binary search repeats using the half of the section storing the higher values. If the value is less than the mid-point the binary search repeats using the half of the section storing the lesser values. This process repeats, narrowing the number of entries being considered, until a match is identified or determined to be absent.

Figure 2:
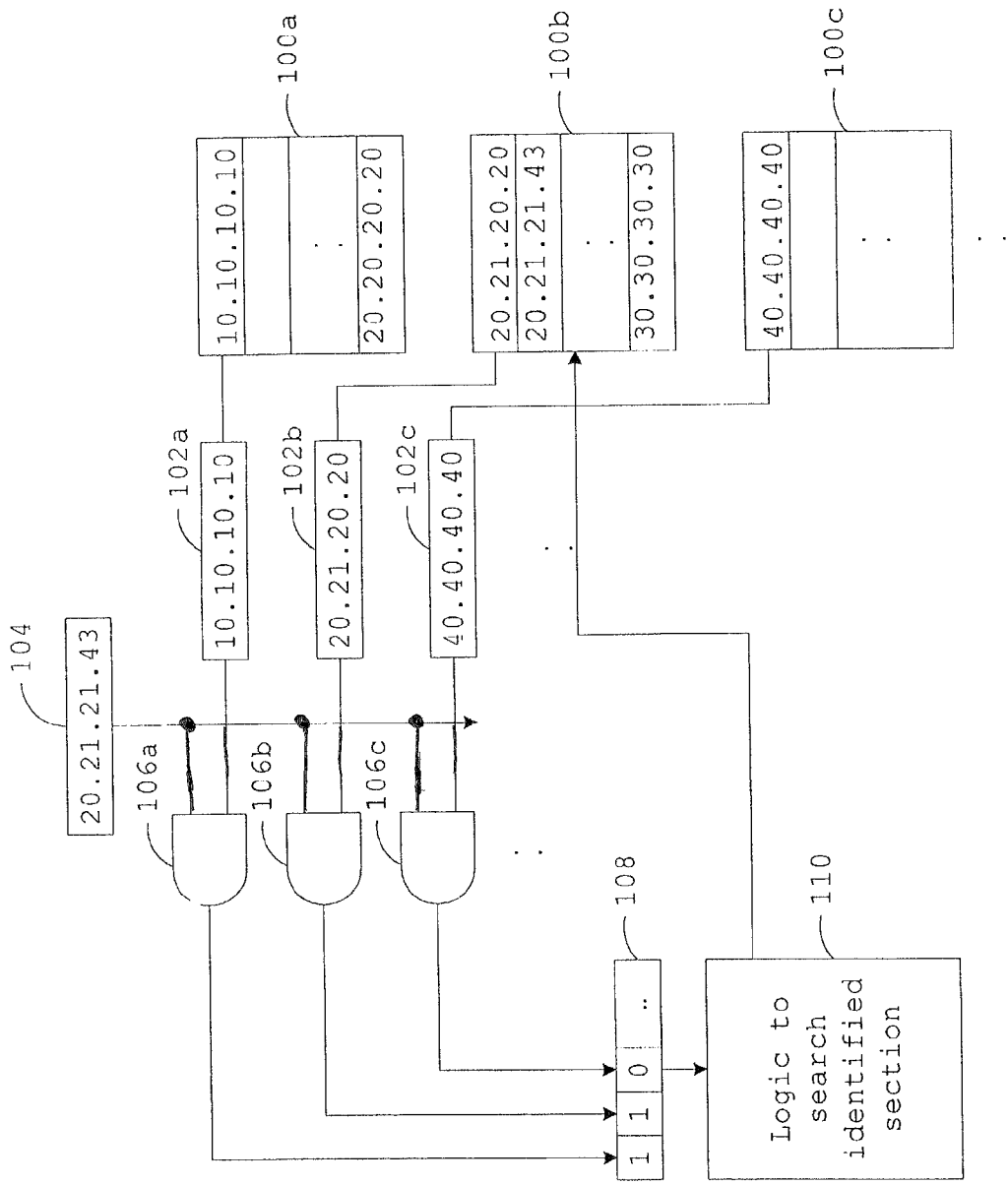

FIG. 2 illustrates sample operation of the system. In the example shown, the network address 104 is greater than shadow values 102*a* and 102*b*, but not subsequent shadow values 102*c*. Thus, the bit-array of "110 . . . " identifies the second section 100*b* as the section that would store an entry for the address 104 if one existed. Based on the bit-array (e.g., a "case" statement operating on the bit-array), the search logic 110 can search the identified section 100*b* for a match.

The techniques illustrated above can quickly search a very large set of addresses. As an example of potential speed savings, a pure binary search of a table for $2^n$ entries may use n+1 cycles to determine if a match for an address exists, assuming one cycle per comparison. For example, for a 1024-entry table, a binary search may use up to 11 cycles. The techniques described above, however, can perform some of the comparisons in parallel. Thus, if the 1024-entry table is divided into eight 128-entry sections, the techniques described above can perform a search using 8 cycles to search the 128-entry section identified by the bit-array and 1 cycle to perform the parallel comparison of address to boundary values. This potential savings in cycles can help a device maintain wire speed processing even as connection rates reach 10 Gigabits/second, 40 Gigabits/second, and higher (e.g., Ethernet, OC-192, or OC-768). Additionally, these savings may be garnered without the expense of a content-addressable memory (CAM).

FIG. 3 depicts a sample section 120 in greater detail. In this example, the section 120 is implemented as a table. In addition to a set 122 of network addresses sorted from most-significant-bit to least-significant-bit in an ascending fashion, the table 120 stores the network mask associated with a network address. The table 120 may also store information associated with the address. For example, for routing, the table 120 may include an Ethernet address or outgoing interface used to reach the next hop for a packet. Instead of, or in addition to such forwarding information, the table 120 may identify filtering, quality of service, and/or processing policies (not shown) that should be applied to a packet having a particular source or destination address.

Figure 4:
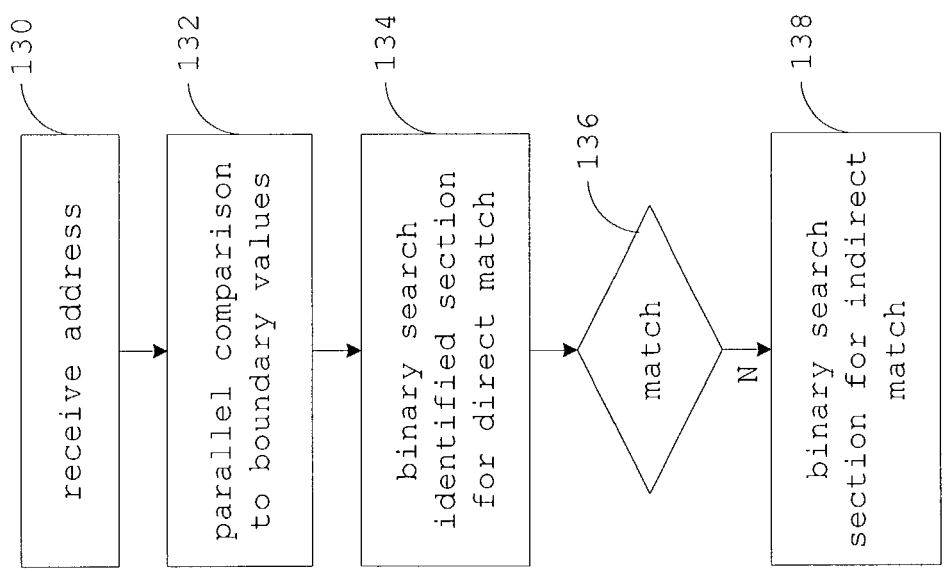
FIG. 4 is a flowchart of a process to lookup an address.

The techniques illustrated above may be used in a variety of lookup processes. For example, FIG. 4 illustrates a process for looking up a best prefix match for a network address. As shown, after performing a parallel comparison 132 of a received 130 network address with the boundary values, the process performs a binary search 134 of the section identified by the comparison results for a direct route match.

If the search 134 for a direct match fails 136, the process may search 138 the section for an indirect route. The search 138 for an indirect route can proceed like a binary search for an exact match. However, in searching for an indirect route, the mask of each route entry encountered during the search is applied to the network address. To increase speed of this operation, the mask may also be stored in a shadow register. If the masked network address and the route entry match, the process proceeds by linearly stepping through succeeding entries after the match. After encountering an entry that does not match, the preceding entry represents the best pattern match.

As an example, assume table 120 in FIG. 3 is being searched for a best prefix match for the network address "192.160.12.5". Assuming the middle entry is entry 122*f*, "206.21.139.0/24", the mask of entry 122*f*, "/24" is applied to address "192.160.12.5" and yields "192.160.12.0". Since "192.160.12.0" does not match "206.21.139.0", the binary search continues with the middle entry 122*c* of the entries 122*a*-122*e* preceding entry 122*f*. Thus, the mask of entry 122*c*, "/16", is applied to address "192.160.12.5" to yield "190.160.0.0". This value equals the address value of entry 122*c*. Once a match has been found, succeeding entries are tested for matches until one is found that does not match. Thus, the mask of entry 122*d*, "/24", is applied to address "192.160.12.5" to yield "192.160.12.0". This value matches the address value of entry 122*d*, thus, the examination of subsequent entries continues. Finally, the mask of entry 122*e*, "/32", is applied to the network address "192.160.12.5" to yield "192.160.12.5". This value does not match the address, "192.160.12.129", of entry 122*e*. Thus, the preceding entry 122*d* represents the best prefix match for address "192.160.12.5".

Figure 5:
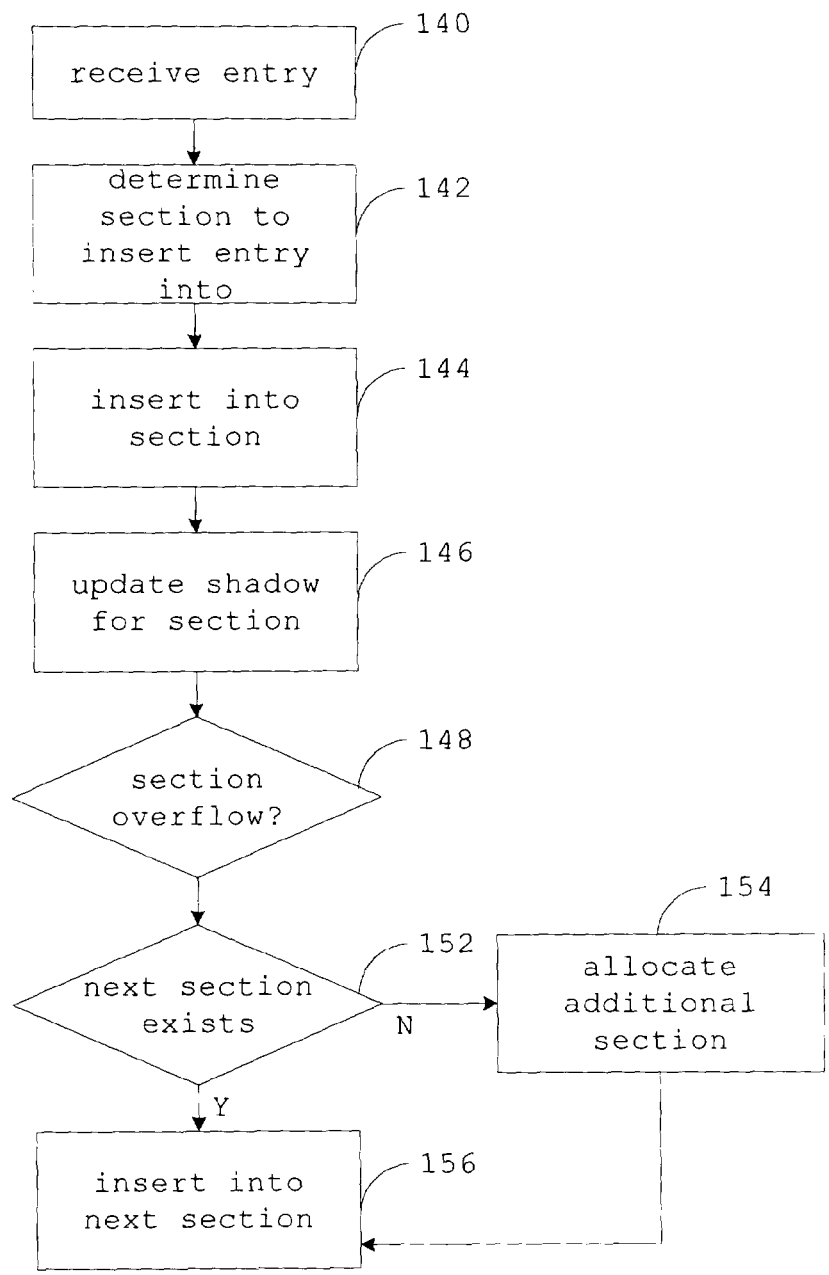
FIG. 5 is a flowchart of a process to insert an address.

FIG. 5 depicts a process for inserting addresses into the sections. The process may be used to initially load the sections and/or to add new addresses, for example, to update a routing table. As shown, the process determines 142 a section to store a new entry 140, for example, using the lookup techniques described above (e.g., comparing the new address with the shadow copies of section boundaries). After identifying a section, the process inserts 144 the new entry in section in its proper order. Potentially, the new entry constitutes a new boundary for the section. Thus, the process may update 146 the shadow value(s) for the section.

Insertion of the new entry may cause an overflow 148 in the section (e.g., a count of section entries may exceed a maximum number of section entries). If there already exists 152 a section beyond the current section, the process moves 156 the overflowing entry to the following section and updates the section's shadow value. Potentially, the overflow of one section may cause a chain reaction of overflows. That is, adding a new entry to a succeeding section may cause that section to overflow, and so forth.

If a section beyond the current section does not yet exist, the process may allocate 154 a new section and storage (e.g., an unused register) for the new section's shadow value. The ability to incrementally add sections as needed can potentially conserve memory. For example, in a system that allocates memory from a pool, the ability to allocate sections when needed allows for scalability and can limit the memory used to store lookup information to that needed for a current network configuration. Additionally, the number of sections can be independent of the search technique(s) used to search within a section. For example, though using a binary search to identify matching entry, the number of sections need not necessarily equal $2^n$ number of sections.

Figure 6:
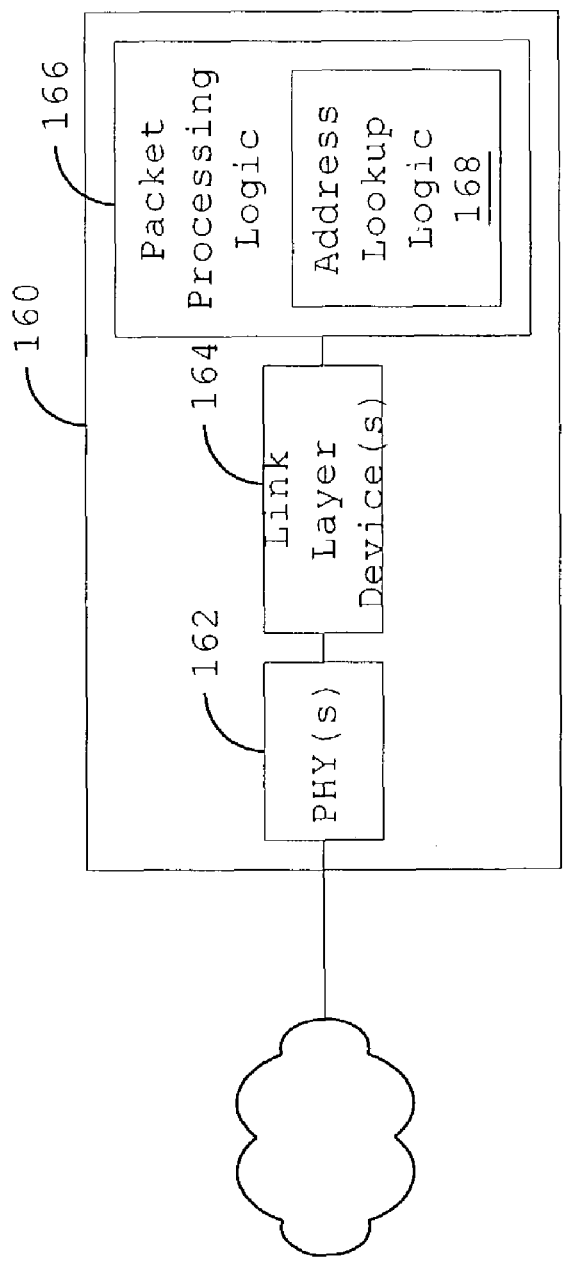
FIG. 6 is a diagram of a network device that looks up addresses.

The techniques described above may be used in a wide variety of network devices. For example, FIG. 6 illustrates a network device 160 featuring one or more physical layer (PHY) devices 162 for handling physical transmission over a medium (e.g., copper wire, optical, or wireless connection). The device 160 also includes one or more link layer devices 164 such as an Ethernet medium access control (MAC) device or a Synchronous Optical Network (SONET) framer. The device 160 may also connect to a switch fabric (not shown) that enables the device to provide access to connections offered by other sets of PHY(s) 162 and link layer 164 devices.

The packet processing logic 166 operates on packets arriving via the PHY 162 and link layer 164 devices. The logic 166 may perform a variety of operations such as packet classification, filtering, and/or forwarding (e.g., routing and switching). As shown, the logic 166 includes address lookup logic 168 implementing techniques described above.

While described as applying to Internet Protocol addresses, the techniques described above may be used for a variety of addressing and sorted search schemes, for example, at the network level or other levels within a protocol stack. For example, the technique may be used to lookup Ethernet addresses. Additionally, while the above discussed 32-bit IP addresses of IPv4, the techniques may also be used with the longer addresses of IPv6 and other present and future standards. Further, in addition to searching for network addresses, the techniques can be used in other searching applications.

The techniques described above may be integrated into a wide variety of network devices and network components. For example, the techniques may be implemented for inclusion in a router, switch, or Transmission Control Protocol/Internet Protocol (TCP/IP) off-load engine ("TOE") that handles TCP/IP operations (e.g., maintaining a TCP/IP state machine, generating ACK messages, and so forth) for a host or hosts.

While shown as featuring a combination of hardware (e.g., shadow registers and comparators) and software (search logic), the techniques may be implemented in entirely in hardware (e.g., as an Application-specific Integrated Circuit (ASIC)), firmware, software (e.g., computer instructions disposed on a computer readable medium), or some combination thereof. For example, the shadow values may exist in a partition of memory that can be read quickly while the actual sections may exist in multiple memory partitions (or on another storage device) that may take longer to access. The use of the shadow values, thus, can, potentially, avoid slower memory accesses.

Other implementations are within the scope of the following claims.

What is claimed is:

1. A method of accessing an address within a collection of addresses, the method comprising:
   identifying by a hardware logic circuitry in a set of sections storing ordered sub-sets of the collection of addresses, the identifying based on a comparison of the address with at least one boundary value of at least one of the sections, wherein the address comprises a complete Internet Protocol (IP) address and the at least one boundary value also comprises a complete IP address; and
   searching the identified section for a match for the address.

2. The method of claim 1, further comprising performing the comparison of the address with the at least one boundary value.

3. The method of claim 2, wherein performing the comparison comprises comparing the address with boundary values of multiple sections in parallel.

4. The method of claim 2, further comprising setting bits within a bit-array based on the comparing, wherein an individual bit within the array identifies the result of a comparison of the address with a one of the boundary values.

5. The method of claim 2, wherein the comparing comprises accessing registers storing the boundary values.

6. The method of claim 1, wherein the boundary values comprise at least one of the following: a first address in a section and a last address in a section.

7. The method of claim 1, wherein the searching the identified section comprises searching for a best matching prefix match.

8. The method of claim 7, wherein the searching comprises applying a network mask of a network address to the address.

9. The method of claim 1, wherein the searching comprises at least one binary search of the identified section.

10. The method of claim 9, wherein the set of sections includes a number of sections that does not necessarily equal $2^n$ number of sections, where n is an integer.

11. The method of claim 1, further comprising allocating a new section to the set of sections.

12. The method of claim 11, wherein allocating a new section comprises:
    allocating a register from a collection of registers; and
    storing a boundary value for the new section in the allocated register.

13. The method of claim 1, further comprising accessing forwarding information based on the searching.

14. The method of claim 1, wherein the collection of addresses comprises addresses in a routing table.

15. A system to access an address within a collection of addresses, the system comprising:
    a hardware logic circuitry to: identify a section in a set of sections storing ordered sub-sets of the collection of addresses, the identifying based on a comparison of the address with at least one boundary value of at least one of the sections, wherein the address comprises a complete Internet Protocol (IP) address and the at least one boundary value also comprises a complete IP address; and
    search the identified section for a match for the address.

16. The system of claim 15, further comprising logic to perform the comparison of the address with the at least one boundary value.

17. The system of claim 16,
    further comprising a set of registers, an individual register in the set of registers storing a boundary value; and
    wherein the logic to perform the comparison comprises a set of comparators to compare the address with the register values in parallel.

18. The system of claim 15, wherein the logic to search a section for the match comprises logic to perform a best matching prefix match for an Internet Protocol (IP) address.

19. The system of claim 15, wherein the logic to search a section for the match comprises logic to perform at least one binary search of the section.

20. The system of claim 15, further comprising logic to allocate a new section and store a boundary value for the new section.

21. A network device, comprising:
    at least one physical layer (PHY) component;
    at least one Ethernet medium access controller (MAC) coupled to the at least one PHY device;
    a hardware logic circuitry to: operate on a complete Internet Protocol (IP) address included within an IP packet received via the at least one PHY and the at least one Ethernet MAC, the logic to:
        compare, in parallel, the IP address with boundary values of a set of sections storing ordered sub-sets of addresses in a routing table, wherein each of the boundary values comprise a complete IP address; and
        search a section for a best matching prefix match to the IP address based on results of the logic to compare the address with the boundary values.

22. The device of claim 21,
    further comprising a set of registers, an individual register storing a boundary value; and
    wherein the logic to compare the IP address with boundary values comprises a set of comparators to compare the IP address with register values in parallel.

23. The device of claim 21, wherein the logic to search a section for the match comprises logic to perform at least one binary search of the section.

* * * * *